United States Patent
Murata

(10) Patent No.: US 7,542,894 B2
(45) Date of Patent: Jun. 2, 2009

(54) SYSTEM AND METHOD FOR ANALYZING LANGUAGE USING SUPERVISED MACHINE LEARNING METHOD

(75) Inventor: Masaki Murata, Osaka (JP)

(73) Assignee: National Institute of Information and Communications Technology, Tokyo (JP)

(*) Notice: Subject to any disclaimer, the term of this patent is extended or adjusted under 35 U.S.C. 154(b) by 421 days.

(21) Appl. No.: 10/189,580

(22) Filed: Jul. 8, 2002

(65) Prior Publication Data

US 2003/0083859 A1 May 1, 2003

(30) Foreign Application Priority Data

Oct. 9, 2001 (JP) .............................. 2001-311453

(51) Int. Cl.
G06F 17/20 (2006.01)
G06F 17/27 (2006.01)

(52) U.S. Cl. .............................................. 704/9; 704/1

(58) Field of Classification Search ............... 704/1–10; 706/12, 47, 20; 707/6
See application file for complete search history.

(56) References Cited

U.S. PATENT DOCUMENTS

| | | | | | |
|---|---|---|---|---|---|
| 5,675,710 | A * | 10/1997 | Lewis | ............................ | 706/12 |
| 5,892,919 | A * | 4/1999 | Nielsen | ........................ | 709/228 |
| 5,956,739 | A * | 9/1999 | Golding et al. | ............... | 715/533 |
| 6,343,266 | B1 * | 1/2002 | Paul et al. | .......................... | 704/9 |
| 6,519,580 | B1 * | 2/2003 | Johnson et al. | ................ | 706/47 |
| 6,618,697 | B1 * | 9/2003 | Kantrowitz et al. | ............. | 703/22 |
| 6,618,715 | B1 * | 9/2003 | Johnson et al. | ................ | 706/47 |
| 6,684,201 | B1 * | 1/2004 | Brill | .............................. | 706/45 |
| 6,766,287 | B1 * | 7/2004 | Kupiec et al. | .................... | 704/9 |
| 6,839,665 | B1 * | 1/2005 | Meyers | ............................ | 704/9 |
| 6,871,174 | B1 * | 3/2005 | Dolan et al. | ...................... | 704/9 |
| 6,901,399 | B1 * | 5/2005 | Corston et al. | ................... | 707/6 |
| 6,910,003 | B1 * | 6/2005 | Arnold et al. | .................... | 704/4 |
| 6,917,926 | B2 * | 7/2005 | Chen et al. | ...................... | 706/12 |
| 6,947,918 | B2 * | 9/2005 | Brill | .............................. | 706/45 |
| 7,047,493 | B1 * | 5/2006 | Brill et al. | ...................... | 715/533 |
| 7,089,217 | B2 * | 8/2006 | Kasabov | ......................... | 706/12 |
| 2002/0111793 | A1 * | 8/2002 | Luo et al. | ........................ | 704/10 |

OTHER PUBLICATIONS

Tomoyoshi Matsukawa, Scott Miller, Ralph Weischedel, "Example-Based Correction of Word Segmentation and Part of Speech Labelling", ACM 1993.*

(Continued)

*Primary Examiner*—Patrick N Edouard
*Assistant Examiner*—Eric Yen
(74) *Attorney, Agent, or Firm*—Staas & Halsey LLP

(57) ABSTRACT

A system for analyzing language using supervised learning method. The system extracts portions matching the structures of problem expressions from a raw corpus that is not supplemented with analysis information, then converts the extracted portions corresponding to the problem expressions into supervised data including problems and solutions and stores in the data storage. The system extracts sets of solutions and features from the supervised data stored in the data storage, carries out machine learning processing using the sets and stores learned results as to what kind of solution is the most straightforward for which feature in the learning results database. The system then extracts sets of features from the inputting object data, extrapolates analysis information showing the most optimum for a certain feature, from the sets of features based on the learning results database.

7 Claims, 9 Drawing Sheets

OTHER PUBLICATIONS

Sadao Kurohashi, et al., "A Method of Case Structure Analysis for Japanese Sentences based on Examples in Case Frame Dictionary", IEICE Transactions on Information and Systems, vol. E77-D, No. 2, pp. 227-239, Published: Feb. 1994.

Daisuke Kawahara, et al., "Case Frame Construction by Coupling the Predicate and Its Adjacent Case Component", Information Processing Institute, Natural Language Processing Society), 2000-NL-140-18, Published: Nov. 21, 2000.

Takeshi Abekawa, et al., "Analysis of Root Modifiers in the Japanese Language Utilizing Statistical Information", Seventh Annual Conference of the Language Processing Society), pp. 270-271, Published: Mar. 27, 2001.

Timothy Baldwin, "Making Lexical Sense of Japanese-English Machine Translation: A Disambiguation Extravaganza", Technical Report, Tokyo Institute of Technology, Technical Report, ISSN 0918-2802, pp. 69-122, Published: Mar. 2001.

Walter Daelemans, et al., "Timbl: Tilburg Memory Based Learner Version 3.0 Reference Guide," Technical Guide, Technical Report, ILK Technical Report-ILK 00-01, pp. 1-52, Published: 1995 (and revised 2000).

Masaki Murata, et al., "Resolution of Verb Phrase Ellipsis in Japanese Sentences Using Surface Expressions and Examples", Information Processing Society Journal), 2000-NL-135, p. 120, Published: Jan. 27, 2000.

Masaki Murata, et al., "Question Answering System Using Syntactic Information", Published: Nov. 15, 1999.

Masaki Murata, et al., "Question Answering System Using Similarity-Guided Reasoning", Natural Language Processing Society), vol. 5, No. 1, pp. 182-185, Published: Jan. 27, 1998.

Masaki Murata, et al., "Information Extraction Using Question Answering Systems", Sixth Annual Language Processing Conference Workshop Proceedings), p. 33, Published: Mar. 10, 2000.

Masaki Murata, et al., "An Estimate of Referents of Pronouns in Japanese Sentences Using Examples and Surface Expressions", Language Processing Review, vol. 4, No. 1, pp. 101-102, Published: Jan. 10, 1997.

Masaki Murata, et al. "Indirect Anaphora Resolution in Japanese Nouns Using Semantic Constraint", Language Processing Review vol. 4, No. 2, pp. 42-44, Published: Apr. 10, 1997.

Shosaku Tanaka, et al., "Acquisition of Semantic Relations of Japanese Noun Phrases 'NP' 'no' 'NP' by Using Statistical Property", Society for Language Analysis and Communication Research), NLC98-1-6(4), p. 26, Published: May 15, 1998.

Masaki Murata, et al., Metonymy Interpretation Using the Examples, "Noun X of Noun Y" and "Noun X Noun Y", Artificial Intelligence Academic Review), vol. 15, No. 3, p. 503, Published: May 1, 2000.

Masao Uchiyama, et al., Statistical Approach to the Interpretation of Metonymy, Artificial Intelligence Academic Review), vol. 7, No. 2, p. 91, Published: Apr. 10, 2000.

Masaki Murata, et al., "Experiments on Word Sense Disambiguation Using Several Machine-Learning Methods", Society for Language Analysis in Electronic Information Communications Studies and Communications), NCL2001-2, pp. 8-10, Published: May 4, 2001.

Nello Cristianini et al., "An Introduction to Support Vector Machines and Other Kernel-Based Learning Methods", Cambridge University Press, Published: 2000.

Taku Kudoh, Tinysvm: Support Vector Machines, http://cl.aist-nara.ac.jp/taku-ku//software/TinySVM/index.html , Disclosed: 2000.

Taku Kudo, et al., Chunking With Support Vector Machines, Society for Natural Language Processing), 2000-NL-140, pp. 9-11, Published: Nov. 21, 2000.

Masaki Murata, et al., "Anaphora/Ellipsis Resolution Method Using Surface Expressions and Examples," Society for Language Analysis and Communication Research), NCL97-56, pp. 10-16, Published: 1997.

Sadao Kurohashi, et al., "Kyoto University Text Corpus Project", Third Annual Conference of the Language Processing Society), p. 118, Published: Mar. 17, 1997.

* cited by examiner

FIG.6

$$f(x) = \text{sgn}\left(\sum_{i=1}^{l} \alpha_i y_i K(x_i, x) + b\right) \quad (1)$$

$$b = -\frac{\max_{i, y_i = -1} b_i + \min_{i, y_i = 1} b_i}{2}$$

$$b_i = \sum_{j=1}^{l} \alpha_j y_j K(x_j, x_i)$$

FIG.7

$$L(\alpha) = \sum_{i=1}^{l} \alpha_i - \frac{1}{2}\sum_{i,j=1}^{l} \alpha_i \alpha_j y_i y_j K(x_i, x_j) \quad (3)$$

$$0 \leq \alpha_i \leq C \, (i = 1, \ldots, l) \quad (4)$$

$$\sum_{i=1}^{l} \alpha_i y_i = 0 \quad (5)$$

FIG.9

|  | TOPICALIZATION | EMBEDDED SENTENCE TRANSFORMATION |
|---|---|---|
| GA CASE | 526 | 499 |
| WO CASE | 29 | 46 |
| NI CASE | 14 | 45 |
| DE CASE | 16 | 10 |
| TO CASE | 0 | 2 |
| KARA CASE | 0 | 1 |
| SONO TA (OTHERS) | 75 | 267 |
| TOTAL | 660 | 870 |

FIG.10

| TiMBL | SB | DL | ME | SVM |
|---|---|---|---|---|
| 27.40% | 50.22% | 54.70% | 66.93% | 70.25% |

FIG.11

|  | TiMBL | SB | DL | ME | SVM |
|---|---|---|---|---|---|
| COMBINED | 9.85% | 71.13% | 75.34% | 82.24% | 87.04% |
| BORROWING | 10.61% | 44.11% | 33.42% | 51.18% | 55.39% |
| NON-BORROWING | 86.03% | 82.07% | 84.68% | 86.87% | 88.22% |

FIG.12

|  | TiMBL | SB | DL | ME | SVM |
|---|---|---|---|---|---|
| COMBINED | 21.90% | 45.74% | 37.33% | 51.35% | 62.16% |
| BORROWING | 28.63% | 48.31% | 31.37% | 54.40% | 59.11% |
| NON-BORROWING | 24.93% | 52.79% | 31.95% | 42.90% | 44.96% |

FIG.13

|  | TiMBL | SB | DL | ME | SVM |
|---|---|---|---|---|---|
| COMBINED | 8.95% | 65.42% | 51.50% | 71.63% | 81.57% |
| NON-BORROWING | 64.05% | 70.00% | 72.35% | 80.46% | 82.55% |

FIG.14

|  | TiMBL | SB | DL | ME | SVM |
|---|---|---|---|---|---|
| COMBINED | 24.35% | 43.57% | 29.28% | 46.57% | 56.93% |
| NON-BORROWING | 22.90% | 50.23% | 33.67% | 46.29% | 47.03% |

SYSTEM AND METHOD FOR ANALYZING LANGUAGE USING SUPERVISED MACHINE LEARNING METHOD

BACKGROUND OF THE INVENTION

1. Field of the Invention

The invention relates to a system and a method for analyzing language using a supervised machine learning method. The present invention can be applied to an extremely wide range of problems including processing for generating phraseology such as ellipsis supplemented processing, sentence generation processing, machine translation processing, character recognition processing and speech recognition processing etc, which enable the use of a language processing system which is extremely practical.

2. Description of the Related Art

In the field of language analysis processing, the importance of semantic analysis processing at the next phase of morphological analysis and syntax analysis is increasing. In particular, with case analysis processing and ellipsis analysis processing etc. that are principal elements of semantic analysis, it is desirable to alleviate the workload involved in processing and increase processing accuracy.

Case analysis processing is a type of processing for restoring a surface case hidden by topicalizing or adnominal modifying a part of a sentence. For example, the sentence "ringo ha tabeta(りんごは食べた).)(As for the apple, I ate it)", "ringo ha(りんごを)(As for the apple)" denotes a topic of the sentence. When the sentence is analyzed and modified into a non-topicalized sentence "(watashi wa) ringo wo tabeta ((私は)りんごを食べた)(I ate the apple)", the surface case will be come out as "ringo wo(りんごを)". In this case, the "ha(は)" or "ringo ha(りんごを)" is analyzed, and "wo(ヲ) case" is obtained as a surface case.

Further, in another example "kyou katta hon wa mou yonda(昨日買った本はもう読んだ) (I already read the book which I bought yesterday)", "katta hon(買った本)(the book which I bought)" is the relative clause of the verb "読んだ(already read . . . )". When the relative clause is analyzed and modified into a simple sentence "(watashi ha) hon wo katta ((私は)本を買った)(I bought a book)", the result, "katta hon(買った本)", syntactically has a case frame "wo(ヲ) case."

Ellipsis analysis processing is a type of process for eliciting a asyndetic part or a surface case of a sentence. Another example is "mikkan wo kaimashita. Soshite, tabemashita(みかんを買いました. そして食べました)(I bought tangerines. And I ate (them))". The clause "soshite tabemashita(そして食べました)(And I ate (them))" in which the object is omitted, also called "a zero pronoun", is analyzed and modified into the sentence "soshite mikan wo tabernashita(そしてみかんを食べました)(Then, I ate tangerines)". Therefore, the asyndetic part is turn out to be "mikan wo(みかんを) (tangerines as an object)" which has a case frame "wo(ヲ) case as an elliptic case particle."

The following references are provided as related technology pertaining to the present invention.

The utilization of existing case frames as shown in the following cited reference 1 is given as a case analysis method.

[Cited reference 1: Sadao Kurohashi and Makoto Nagao, *A Method of Case Structure Analysis for Japanese Sentences based on Examples in Case Frame Dictionary*, IEICE Transactions on Information and Systems, Vol. E77-D, No. 2, pp227-239 (1994)]

Further, as shown in the following cited reference 2, case frames are constructed from a corpus that does not have groups of analysis targets and has no information added to it (hereinafter referred to as a "raw corpus"), and these case frames are then utilized.

[Cited reference 2: みかんを犬, 用言と直前の格要素の組を単位とする格フレームの自動獲得, 情報処理学会,自然言語処理研究会(Daisuke Kawahara and Sadao Kurohashi, *Case Frame Construction by Coupling the Predicate and its Adjacent Case Component*, Information Processing Institute, Natural Language Processing Society), 2000-NL-140-18 (2000)]

As shown in cited reference 3 in the following, in case analysis, frequency information for a raw corpus rather than for a corpus provided with case information is utilized, and case is then obtained through estimation of maximum likelihood.

[Cited reference 3: 阿辺川武, 白井清昭, 田中穂積, 徳永健伸, 統計情報を利用した日本語連体修飾語の解析, 言語処理学会第7回年次大会(Takeshi Abekawa, Kiyoaki Shirai, Hozumi Tanaka, Takenobu Tokunaga, *Analysis of Root Modifiers in the Japanese Language Utilizing Statistical Information*, Seventh Annual Conference of the Language Processing Society), pp270-271 (2001)]

As shown in cited example 4 in the following, a TiMBL technique (refer to cited reference 5) that is one type of k neighborhooed methods is used as a machine learning method employing a corpus with case information.

[Cited reference 4: Timothy Baldwin, *Making Lexical Sense of Japanese-English Machine Translation: A Disambiguation Extravaganza*, Technical Report, Tokyo Institute of Technology, Technical Report, ISSN 0918-2802, pp69-122 (2001)]

[Cited reference 5: Walter Daelemans, Jakub Zavrel, Ko van der Sloot, and Antal van den Bosch, *Timbl: Tilbury Memory Based Learner version 3.0 Reference Guide*, Technical report, ILK Technical Report-ILK 00-01 (1995)]

The research of Abekawa shown in cited reference 3 and the research of Baldwin shown in cited reference 4 only handles case analysis processing for performing transformations to embedded sentences.

Conventionally, case information for a corpus with case information taken as examples when performing case analysis on Japanese is supplemented manually. However, supplementing of the analysis rules and analysis information encounters a serious problem regarding the human resources and labor burden involved in expanding and adjusting rules. This point justifies the use of supervised machine learning methods in language analysis processing. However, in conventional supervised machine learning methods, a corpus supplemented with analysis target information is used as supervised data. It is necessary in this case to alleviate the labor burden involved in supplementing the corpus with analysis target information.

Further, it is necessary to use a large amount of supervised data in order to improve processing accuracy. The research of Abekawa in cited reference 3 and the research of Baldwin in cited reference 4 perform case analysis processing by employing raw corpus not provided with case information. This case analysis processing technology handles only transformation into embedded sentences.

Therefore, there is a demand for machine learning methods that can use a raw corpus that is not provided with information constituting an analysis target in a broader range of language processing.

SUMMARY OF THE INVENTION

The object of the present invention is to implement a language ellipsis analysis processing system including transformations by paraphrasing, where the system utilizes a supervised learning method that uses a raw corpus which is not supplemented with information constituting analysis target as supervised data (hereinafter, referred to as "the borrowing-type supervised learning method".)

Further, the language analysis processing system may use the supervised machine learning method including processes for performing calculations using framing that take into consideration the degree of importance of each feature and subordinate relationships between features, as the borrowing-type supervised learning method (hereinafter, "feature" means a single unit of detailed information used in analysis).

Moreover, the object of the present invention is to bring about a language analysis processing system that uses a machine learning method (hereinafter, referred to as "the combined-type supervised learning method"), which combines the borrowing-type supervised learning method with a conventional supervised learning method which uses a corpus supplemented with analysis target information (hereinafter referred to as "the non-borrowing-type supervised learning method".)

According to the present invention, besides the conventional supervised data, a large amount of natural phrases and sentences can be added as supervised data so that the number of supervised data used in a system can be increased, and therefore it is anticipated that the learning accuracy will increased.

The present invention provides a system for analyzing language using supervised learning method, the system comprising problem expression extraction processing means for extracting a portion matching with structures of preset problem expression from data not supplemented with information for an analysis target and taking the portion as a portion corresponding to problem expression, problem structure conversion processing means for converting the portion corresponding to problem expression into supervised data including a problem and a solution, machine learning processing means for extracting a set of a plurality of features and a solution from the supervised data, performing machine learning from the extracted set of features and solution, and storing a learning result in a learning result database, features extracting processing means for extracting features from object data inputted, and solution extrapolating processing means for a solution based on the learning result stored in the learning results database.

According to one embodiment of the present invention, the machine learning processing means may perform processing with framing obtained automatically taking into consideration the dependency of each element on the degree of importance of the features.

Further, according to another embodiment of the present invention, the machine learning processing means may perform extracting a set of a plurality of features and a solution, as borrowing-type supervised data, from the supervised data and a set of a plurality of features and a solution, as non-borrowing-type supervised data, from data supplemented with a corpus in advance as information related with an analysis target, and may perform machine learning processing using the borrowing-type and non-borrowing-type supervised data.

Moreover, the present invention provides a method for generating supervised data used as borrowing-type supervised data in language analysis processing using machine learning method, that comprises extracting a portion matching with structure of preset problem expression from data not supplemented with information relating to an analysis target, corresponding that portion to a problem expression, and converting it to supervised data as a pair of a problem and a solution.

Moreover, the present invention provides a method for analyzing language using machine learning method, provided with supervised data storage means for storing supervised data as a pair of a problem and a solution corresponding to an analysis target, the method comprising extracting a set of a plurality of features and a solution from the supervised data, performing machine learning from the extracted set of features and solution and storing a learning result in a learning results database, extracting features from object data inputted, and extrapolating solutions based on the learning result stored in the learning results database.

According to another embodiment of the present invention, a language ellipsis analysis processing system for carrying out analysis of ellipsis which includes transformation by paraphrasing using the machine learning method comprises problem expression extraction processing means for extracting a portion matching with structures of preset problem expression from data not supplemented with information for analysis targets and taking that portion as a corresponding to a problem expression, problem structure conversion processing means for converting the portion corresponding to problem expression into supervised data as a pair of a problem and a solution, machine learning processing means for extracting a set of a plurality of features and a solution from the supervised data, performing machine learning from the extracted set of features and solution, and storing a learning result in a learning result database, features extracting processing means for extracting features from object data inputted, and solution extrapolating processing means for a solution based on the learning result stored in the learning results database.

According to another embodiment of the present invention, even for corpuses that are not supplemented with tags etc. for supervised data for analysis use, if a problem is similar to those of ellipsis analysis, this problem can be borrowed as supervised data. A method is therefore implemented that may be utilized not only in simple case analysis processing, but also in a broad range of language processing problems similar to ellipsis analysis.

Further, borrowing machine learning techniques that borrow supervised data that are not originally borrowing are also proposed, which means that a processing method can be implemented both to alleviates the processing load and to increase the processing accuracy.

BRIEF DESCRIPTION OF THE DRAWINGS

FIG. 6 is an example of formula showing identification function used in an expanded support vector machine method.

FIG. 7 is an example of formulas showing identification function used in an expanded support vector machine method.

FIG. 9 is a view showing a distribution of appearances of classifications for all examples.

FIG. 10 is a view showing a processing accuracy for problems in re-extrapolating case particles.

FIG. 11 is a view showing accuracy in processing for surface case restoration occurring in topicalization/embedded sentence transformation phenomena.

FIG. 12 is a view showing an average accuracy in processing for surface case restoration occurring in topicalization/embedded sentence transformation phenomena.

FIG. 13 is a view showing processing accuracy in general case analysis.

FIG. 14 is a view showing average processing accuracy in general case analysis.

DETAILED DESCRIPTION OF THE PREFERRED EMBODIMENTS

A. Features of the Present Invention

Figure 1:
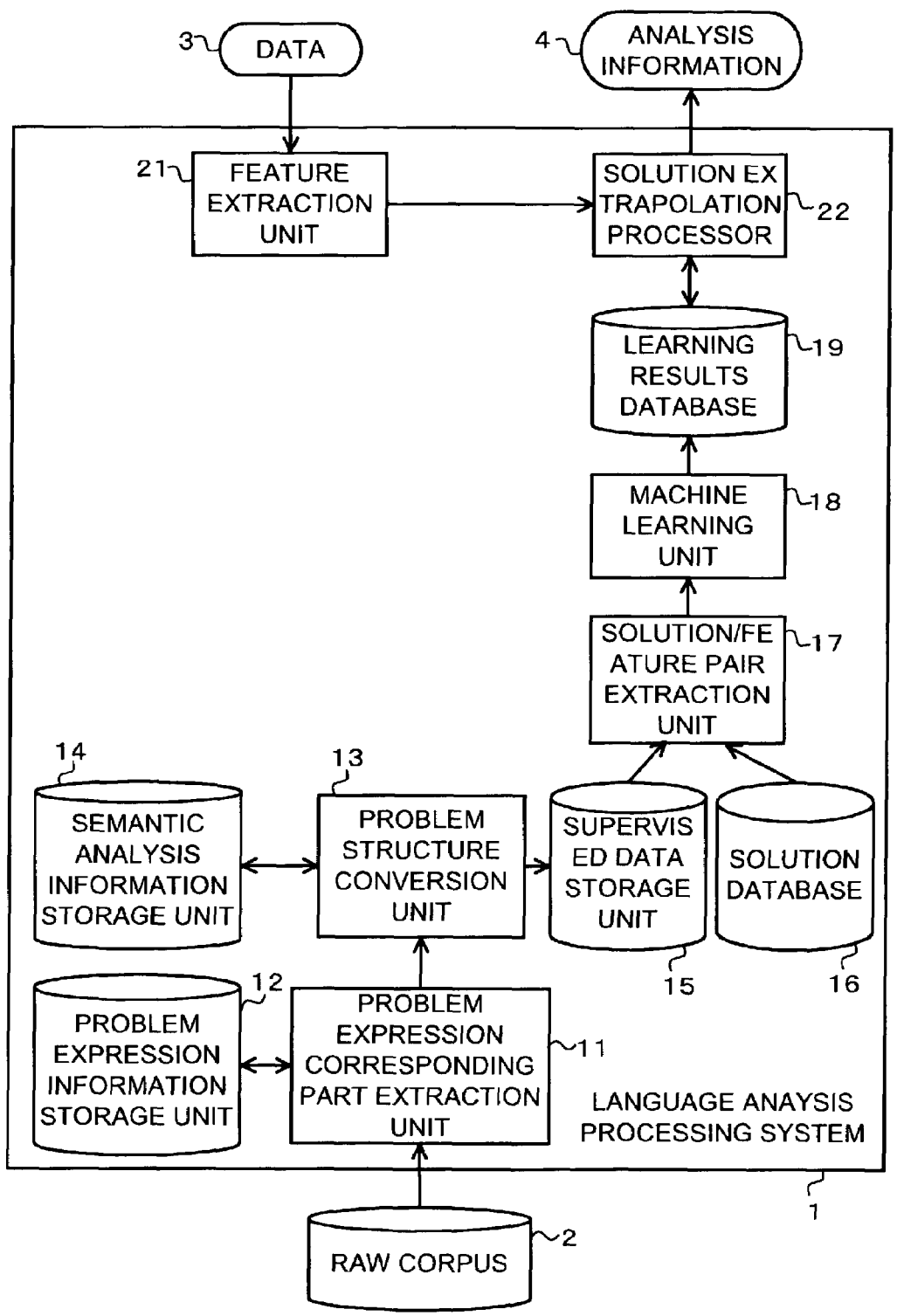
FIG. 1 is a block diagram showing an example configuration for a system according to the present invention.

The present invention provides a system and a method for language analysis processing that can be applied the borrowing-type supervised learning method using a row corpus that contains no analysis target information.

The present invention especially provides a system and method for analysis processing that uses the borrowing-type supervised learning method in ellipsis analysis processing in which the case analysis processing is equivalent to ellipsis analysis processing.

More specifically, the present invention provides a system and a method for analysis processing that uses the borrowing-type supervised learning method for a broader range of language analysis such as verb ellipsis supplementation (refer to cited reference 6) and question answering systems (refer to cited references 7 to 9).

[Cited reference 6: 村田真樹, 長尾真, 日本語文章における表層表現と用例を用いた動詞の省略の補完, 言語処理学会誌 (Masaki Murata and Makoto Nagao, *Resolution of Verb Phrase Ellipsis in Japanese Sentences using Surface Expressions and Examples*, Information Processing Society Journal), 2000-NL-135, p120(1998)]

[Cited reference 7: Masaki Murata, Masao Utiyama, and Hitoshi Isahara, *Question Answering System Using Syntactic Information*, (1999)]

[Cited reference 8: 村田真樹, 内山将夫, 井佐原均, 類似度に基づく推論を用いた質問応答システム, 自然言語処理研究会 (Masaki Murata, Masao Uchiyama and Hitoshi Isahara, *Question Answering System Using Similarity-Guided Reasoning*, Natural Language Processing Society) Vol. 5, No. 1, p.p.182-185(2000)].

[Cited reference 9: 村田真樹, 内山将夫, 井佐原均, 質問応答システムを用いた情報抽出, 言語処理学会第6回年次大会ワークショップ論文集(Masaki Murata, Masao Uchiyama and Hitoshi Isahara, *Information Extraction Using Question Answering Systems*, Sixth Annual Language Processing Conference Workshop Proceedings), pp33 (2000)].

Further, in order to increase the processing accuracy, the present invention provides a system and method for language analysis processing using the combined-type supervised learning method, which uses both supervised data generated based on natural sentences in a raw corpus and conventional supervised data such as information corresponding to analysis targets supplemented with a corpus. More specifically, according to the present invention, the combined-type supervised learning method provides a system for word generation processing by a supplementation processing of ellipsis analysis.

Both the borrowing-type supervised learning method and the combined-type supervised learning method of the present invention are types of supervised machine learning methods, that may include processes for performing calculations using ranking that takes the degree of importance of each feature and subordinate relationships between features into consideration. In this respect, the supervised learning method of the present invention is different from the typical methods of providing classification in machine learning such as k neighborhood methods in which calculation processes that enable the degree of similarity of features, i.e. the degree of subordination, are decided using the features themselves, and the simple Bayesian approach that presumes each element to be independent and does not take into consideration subordination between the elements. The supervised machine learning method of the present invention also differs from maximum likelihood estimation method using frequency in a raw corpus (refer to cited reference 3), proposed by Abekawa et. al. The maximum likelihood estimation is a method for taking an item of the greatest frequency in fixed context as a solution. In another example "ringo <?> taberu (りんご<?> 食べる)(eat an apple)" having a missing portion (here, a case particle) which is located between an indeclinable word "ringo (りんご)(an apple)" and a declinable word "taberu (食べる)(eat)", a case particle that may appear the most frequently at the position of <?> would be taken as a solution for the missing portion of <?>.

B. Survey of Language Analysis Processing Applied in Preferred Embodiments

Some types of language analysis processing applied in preferred embodiments of the present invention are now surveyed. The embodiments of the present invention are described using the borrowing-type supervised learning method on Japanese language analysis processing as an example of language analysis processing.

In correspondence ellipsis analysis, which is one kind of analysis processing, it is considered possible to utilize a corpus that does not contain information related to correspondence ellipsis.

The theoretical background of this technology is now shown using the following example.

Example problem w: "Mikan wo kaimashita, Kore wo tabemashita.(みかんを買いました。これを食べました。)(I bought a tangerine. Then I ate this/it.)"

Example a: "Keiki wo taberu.(ケーキを食べる。)(I ate a piece of cake.)"

Example b: "ringo wo taberu.(りんごを食べる。)(I ate an apple.)"

To extrapolate a referent for "これ(kore)(this/it)" in example problem x, assuming that a noun phrase for "food" is likely to precede "wo tabernashita(を食べました)(ate something)" using examples a and b, it is then possible to extrapolate that "mikan(みかん)(tangerine)" is the referent. Examples a and b are normal sentences so that they are not provided with information regarding the correspondence ellipsis.

On the other hand, consider a solution utilizing an example provided with information relating to the correspondence ellipsis. This type of example takes on the following form.

Example c: "Ringo wo kaimashita. Kore wo tabernashita (りんごを買いました。これを食べました。)(I bought an apple. Then, I ate this/it.), in which the pronoun <kore(これ)(this/it)> takes the noun<ringo(りんご)(an apple)> as its referent."

The example c "Ringo wo kaimashita. Kore wo tabernashita(りんごを買いました。これを食べました。)(I bought an apple. Then, I ate this/it)" is added information that the referent of the correspondence ellipsis of the pronoun "kore (これ)(this/it)" is the antecedent "ringo(りんご)(an apple)". Using the example c, a referent for "kore(これ)(this/it)" in example problem x can be extrapolated. That is, the antecedent "ringo(りんご)(an apple)" in the example c can leads an extrapolation that the "mikan(みかん)(a tangerine)" can be a referent for the example problem x.

However, as in example c, adding information relating to correspondence ellipsis is extremely labor intensive. The present invention provides a process whereby, instead of using information relating to the correspondence ellipsis of example c, ellipsis analysis is done with sentences like examples a and b where the information related to the correspondence ellipsis are not provided. This latter process is more beneficial and cost effective than having to supplement the information relating to correspondence ellipsis.

The following shows an example of ellipsis analysis using an example where information relating to these kinds of analysis targets is not provided.

(1) demonstrative/pronoun/null pronoun correspondence analysis (anaphora analysis)

Problem: "mikan wo kaimashita. Soshite {φwo} tabemashita.(みかんを買いました。そして {φを}食べました。)(I bought a tangerine. Then I ate {φ}.)"

Example: "{ringo} wo taberu. ({りんご}を食べる。)(I ate {an apple}.)"

As previously described, a demonstrative/pronoun/null pronoun correspondence analysis is an analysis extrapolating a referent for a demonstrative or pronoun, or for a pronoun (φ=null pronoun) ellipsis within the sentence. This type of analysis is described in detail in the following cited reference 10.

[Cited reference 10: 村田真樹, 長尾真 用例や表層表現を用いた日本語文章中の指示詞・代名詞・ゼロ代名詞の指示対象の推定, 言語処理学会誌(Masaki Murata and Makoto Nagao, *An Estimate of Referents of Pronouns in Japanese Sentences using Examples and Surface Expressions*), Language Processing Review, Vol.4, No.1, p.p.101-102 (1997)]

(2) Indirect Anaphora Analysis

Problem: "ie ga aru. {yane} ha shiroi. (家がある。{屋根}は白い。)(There is a house. The {roof} of the house is white.)"

Example: "{ie}no yane(家}の屋根)(a roof of {a house})".

An indirect anaphora analysis is a type of analysis that estimates that "yane(屋根) (a roof)" is the roof of the "ie (村田真樹, 長尾真)(a house)" appearing in the previous sentence by utilizing an example in the form of "A no B(AのB)(B of A)." This analysis is described in detail in the following cited reference 11.

[Cited reference 11: 村田真樹, 長尾真 意味的制約を用いた日本語名詞における間接照応解析, 言語処理学会誌(Masaki Murata and Makoto Nagao, *Indirect Anaphora Analysis of Japanese Nouns Using Semantic Constraints*, Language Processing Review Vol.4, No.2, pp42-44 (1997)).

(3) Supplementation of Asyndetic Verbs (Predication Ellipsis)

Example problem: "sou umaku iku to ha. (そううまくいくとは)(It will work out so well.)"

Example: "sonnani umaku iku to ha {omoenai.} (そんなにうまくいくとは{思えない}。)({I do not think} it will work out so well.)"

In this type of analysis, the predication ellipsis of "sou umku iku to ha(そううまくいくとは) (It will work out so well.)" is extrapolated by collection and analyzing sentences including the same portion "sou umaku iku to ha(そううまくいくとは)(It will work out so well.)". This type of analysis is described in the aforementioned cited reference 6.

(4) Semantic analysis of "A no B (AのB)(B of A)".

Example problem: "shyashin no jinbutsu( 写真の人物)(a person in a picture)"→"shyashin ni egakareta jinbutsu (写真に描かれた人物)(a person who appears in a picture)"

Example: "shyashin ni jinbutsu ga egakareru (写真に人物が描かれる)(a picture shows a person)"

In this type of analysis, the semantic relationship between A and B of "A no B (AのB) (B of A)" phraseology varies. However, some semantic relationships can be denoted with verbs. This type of verb can be assumed from information of co-occurrence relationship with a noun A, a noun B and a verb X. In the semantic analysis of "A no B (A のB)(B of A)", semantic relationships are extrapolated using the co-occurrence information. Detailed analysis is now described in the following cited reference 12.

[Cited reference 12: 田中省作, 富浦洋一, 日高達, 統計的手法を用いた名詞句「NPのNP」の意味関係の抽出法, 言語理解とコミュニケーション研究会(Shosaku Tanaka, Yoichi Tomiura and Tachi Hidaka, *Acquisition of Semantic Relations of Japanese Noun Phrases "NP 'no' NP" by using Statistical Property*, Society for Language Analysis and Communication Research), NLC98-1~6 (4), p26 (1998)].

(5) Metonymic Analysis

Example problem: "Soseki wo yomu(漱石を読む)(read Souseki)"→"Soseki no shousetsu wo yomu (漱石の小説を読む)(I read the novels of Souseki.)"

Example: "Soseki no Shousetsu(漱石の小説)(the novels of Souseki)", "Shousetsu wo yomu(小説を読む)(read the novels)"

"Soseki(漱石)" of "Soseki wo yomu(漱石を読む)(read Souseki)" means "souseki ga kaita shousetsu (漱石が書いた小説)(the novels which Souseki wrote)". A metonymic analysis is a type of analysis where ellipsis information is supplemented by writing a combination form an example taking the form of "A no B(AのB)(B of A)", such as "C wo V suru(CをVする)(a transitive verb V, and its object C)". Cited reference 13 and cited reference 14 are described in the following.

[Cited reference 13: 村田真樹, 山本専, 黒橋禎夫, 井佐原均, 長尾真, 名詞句「AのB」「AB」を利用した換喩解析人工知能学会誌 (Masaki Murata, Hiroshi Yamamoto, Sadao Kurohashi, Hitoshi Isahara and Makoto Nagao, *Metonymy Interpretation Using the Examples*, "Noun X of Noun Y" and "Noun X Noun Y", Artificial Intelligence Academic Review) Vol. 15, No.3, p503 (2000)].

[Cited reference 14: 内山将夫, 村田真樹, 馬青, 内元清貴, 井佐原均, 統計的手法による換喩の解釈, 言語処理学会誌 (Masao Uchiyama, Masaki Murata, Ba Sei, Kiyotaka Uchimoto and Hitoshi Isahara, *Statistical Approach to the Interpretation of Metonymy*, Artificial Intelligence Academic Review) Vol.7, No.2, p91 (2000)]

(6) Case Analysis of Adnominal Clauses

Example problem: "oupun suru shisetsu (オープンする施設)(an opening facility)"→case relationship=ga(ガ) case (subjective case)

Example: "shisetsu ga oupun suru(施設がオープンする)(A facility will open.)"

A case analysis of clauses for embedded sentences is a type of analysis where cases for embedded sentences using cooperative information for the noun and the verb are extrapolated. Content of the detailed analysis is described in detailed in the aforementioned cited reference 3.

C. Preferred Embodiments

FIG. 1 shows an example of a configuration according to an embodiment of the present invention. A language analysis processing system 1 comprises a problem expression corresponding part extraction unit 11, a problem expression information storage unit 12, a problem structure conversion unit 13, a semantic analysis information storage unit 14, a supervised data storage unit 15, a solution/feature pair extraction unit 17, a machine learning unit 18, a learning results database 19, a feature extraction unit 21 and a solution extrapolation processor 22.

The problem expression corresponding part extraction unit 11 is connected to the problem expression information storage unit 12 to see in advance the problem expressions stored in it. The problem expression corresponding part extraction unit is also connected to raw corpus 2, which contains sentences without any analysis target information, and extracts portions of those sentences that correspond to the problem expressions of problem expression corresponding par extraction unit 12.

The problem expression information storage unit 12 stores problem expressions for ellipsis analysis as shown in (1) to (6) in the above. The semantic analysis information storage unit 14 pre-stores semantic analysis information to be used in the case of semantic analysis.

The problem structure conversion unit 13 receives portions of the sentence data that were previously extracted by the problem expression corresponding part extraction unit 11, converts these portions to problem expressions, generates supervised data by pairing problems taken from the sentence of the problem expressions with solutions solved and extracted from the problem expressions, and stores the supervised data in the supervised data storage unit 15.

When it is necessary to transform a sentence resulting from conversion of the problem expressions, the problem structure conversion unit 13 refers to the semantic analysis information storage unit 14, and transforms the resulting sentences to problems.

The solution/feature pair extraction unit 17 is means for extracting groups of sets of solutions and features for each example from supervised data structured problem/solution stored in the supervised data storage unit 15.

The machine learning unit 18 is means for learning the type of solution that is the most suitable for a given set of features using a machine learning method on the groups of sets of at least one solution and features extracted by the solution/feature pair extraction unit 17 and storing these learning results in the learning results database 19.

The feature extraction unit 21 is means for extracting sets of features from inputted data 3 and providing these features to the solution extrapolation processor 22.

The solution extrapolation processor 22 is means for referring to the learning results database 19 and extrapolating the most suitable solution for the sets of features are received from the feature extraction unit 21, and outputting the extrapolation results through the analysis information 4.

Figure 2:
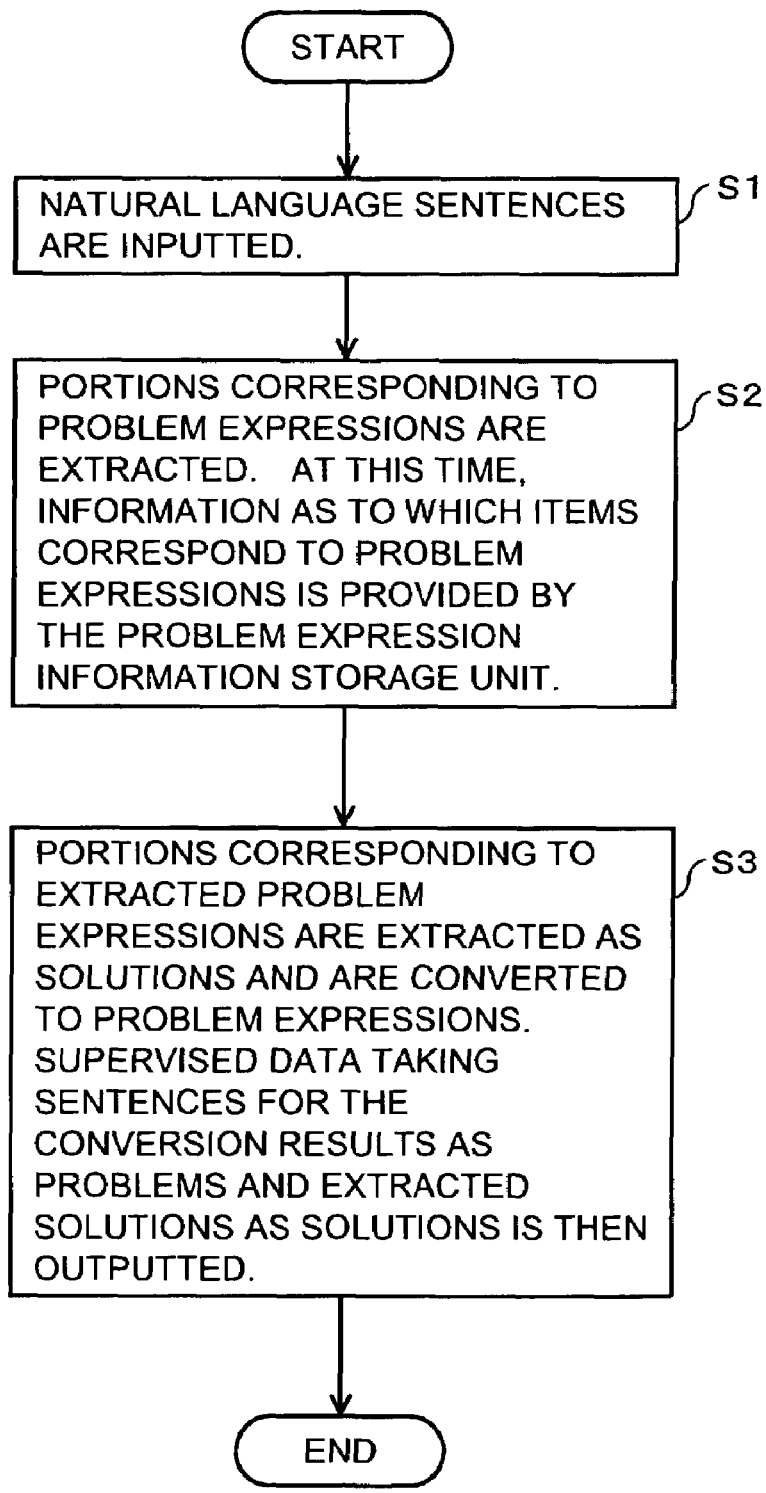
FIG. 2 is a flowchart of a process for generating supervised data.

The following is a description of the flow of the processing of the present invention. FIG. 2 shows a flowchart for the process for generating supervised data.

Step S1: First, natural language sentences that are not provided with any analysis target information are inputted from the raw corpus 2 into the problem expression corresponding part extraction unit 11.

Step S2: The structures of normal sentences inputted from the raw corpus 2 are detected at the problem expression corresponding part extraction unit 11 and portions of the sentences that correspond to problem expressions are extracted. The problem expressions used to extract these portion are the information stored in the problem expression information storage unit 12. Specifically, the structures of the problem expressions and the structures of the inputted normal sentences are matched up and items that coincide are taken to be parts corresponding to problem expressions.

Step S3: At the problem structure conversion unit 13, the portions corresponding to problem expressions extracted by the problem expression corresponding part extraction unit 11 are taken out as solutions. Then, in the input sentences, the extracted portion are replaced with problem expressions and are taken as a problems. The solutions and the problems are then stored in the supervised data storage unit 15 as supervised data.

When semantic analysis information is necessary for converting problem expressions, the problem structure conversion unit 13 refers to the semantic analysis information pre-stored in the semantic analysis information storage unit 14.

Specifically, the following processing is carried out. For example, in a supplementation of asyndetic portion shown in (3) above, the main verb portion of the sentence is defined as a part corresponding to a problem expression, and stored in the problem expression information storage unit 12. Therefore, when a sentence "sonnani umaku iku to ha omoenai (そんなにうまくいくとは思えない)"(I don't think it will work out so well.)"

is input from the raw corpus 2, the problem expression corresponding part extraction unit 11 recognizes the verb portion "omoenai(思えない)")(I don't think)" as a part corresponding to an errorneous expression.

The problem structure conversion unit 13 extracts the verb portion "omoenai(思えない)") (I don't think)" as a solution, and substitutes the portion "omoenai(思えない)")(I don't think)" of the original sentence with code for "asyndetic verb (predication ellipsis)". As a result, supervised data "problem→solution":

"sonnani umaku iku to ha(そんなにうまくいくとは))(It will work out so well.) <asyndetic verb>"→"omoenai(思えない))(I don't think)" is obtained. Then, this supervised data is stored in the supervised data storage unit 15.

The supervised data can also be put in the following form, context(problem): "sonnani umaku iku to ha (そんなにうまくいくとは) ")(It will work out so well.)"→classification(solution): "omoenai(思えない)")(I don't think)". The solution/feature extraction unit 17 may use such a supervised data consisting of a context and its classification for machine learning processing.

For example, with the case analysis shown in (1) above, each case particle is defined as a portion corresponding to a problem expression in the problem expression information storage unit 12. Therefore, when a sentence;

"Ringo wo taberu.(りんごを食べる。)"(I eat an apple.)"

is input from the raw corpus 2, the problem expression corresponding part extraction unit 11 recognizes that the case particle "wo(を)" of the input sentence is the portion corresponding to a problem expression.

The problem structure conversion unit 13 extracts the case particle "wo(を)" as a solution, and then replaces the portion for the case particle "wo(を)" in the original sentence with code for "case to be recognized". As a result, supervised data of;

"problem→solution":

"ringo(りんご)(an apple) <case to be identified>taberu(食べる)(eat)"→"wo(を)(a case particle denoting an objective part)"

is obtained. This supervised data is stored in the supervised data storage unit 15. The supervised data can also be put in the form:

context(problem): "taberu(食べる)(eat)",
classification(solution): "ringo wo(りんごを)(an apple as an object)".

In the other analytical example described above, the same processing is carried out, and respective supervised data is outputted. This method may generate supervised data as follows:

In the case of indirect anaphora analysis mentioned above in (2), context: "no yane (の屋根)(a roof of)", classification: "ie ((家))(a house)".

In the case of the semantic analysis of the aforementioned "B of A" of (4), context: "syasin(写真)(a picture)" and "jinbutu(人物)(a person)",
classification: "egakareru((描かれる))(show in a picture)".

Inn the case of the metonymic analysis described in (5), context: "Soseki no(漱石の)(of Souseki))", classification: "shousetu(小説)(the novels)"
context: "wo yomu((を読む))(read)", classification: "shousetu(小説)(the novels)".

In the case of the case analysis for the subject described above in (6), context: "sisetsu(施設)(a facility)" and "oupun suru ((オープンする))(will open)",
classification "ga(ガ) case)(a case particle denoting a subjective part)".

Regarding problem expressions that can be interpreted with ellipsis analysis, raw corpus 2 which is not provided with tags for use with targets of analysis can be used as supervised data for machine learning methods.

In particular, rather than just simple ellipsis supplementation, in cases where language may be interpreted in a paraphrased manner, as in, for example, "oupun suru shisetsu(オープンする施設)(an opening facility)" which can also be taken to be "shisetsu ga oupun suru (施設がオープンする)"(a facility will open)", the raw corpus 2 can be used as supervised data for mechanical learning methods. Namely, with the majority of problems with semantic interpretation, solutions can be found by using paraphrased sentences. This means that the present invention can also include typical ranges of applications to problems such as providing interpretations through paraphrasing language while slightly varying the language. An embodiment of the present invention given below provides an example where a question and answer system is used.

Answer for a question in a question-and-answer system can be considered as supplementing a missed portion which correspond to an interrogative portion of a question sentence. In this case, extremely similar sentences are collected from the pre-provided database and then portions corresponding with interrogatives of the question sentences are extracted as answers (refer to cited references 7 to 9).

Examples of questions and answers as supervised data are shown below:

Example question: "Nihon no shuto wa doko desu ka? (日本の首都はどこですか?))(What is the capital of Japan?)"→Example answer="Tokyo(東京)", Example question: "Nihon no shuto wa Tokyo desu (日本の首都は東京です。)(The capital of Japan is Tokyo.)" becomes the supervised data;

context: "Nihon no shuto wa(日本の首都は)(The capital of Japan is . . . )",
classification: "Tokyo(東京)", or
context: "no shuto wa Tokyo desu(の首都は東京です)( . . . is the capital of Japan.)",
classification: "Nihon(日本)(Japan)."

The supervised data stored in the supervised data storage unit 15 has the same structural format as normal supervised data and can be used as supervised data in the supervised machine learning methods. Problems can therefore be solved by selecting an optimum method from the various high-grade machine learning methods.

Information used in analysis can be defined with a substantial degree of freedom in machine learning methods. This means that a broad range of information can be utilized as supervised data so that analysis accuracy can be improved in an effective manner.

Figure 3:
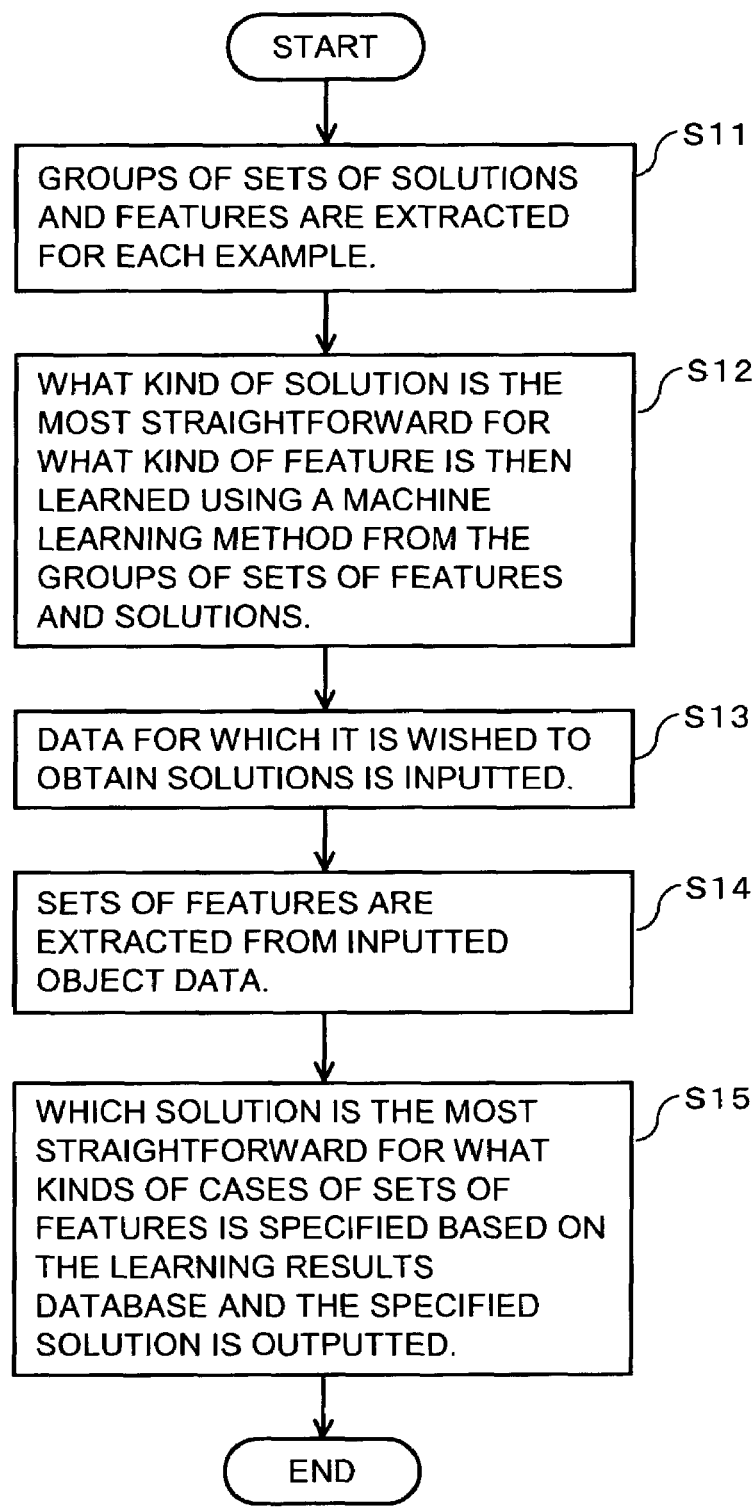
FIG. 3 is a flowchart of an analysis processing using borrowing-type supervised learning method.

FIG. 3 shows a flowchart of analytical processing using machine learning methods taking supervised data as supervised data.

In step S11: First, at the solution/feature pair extraction unit 17, a set of features and a solution are extracted for each example from the supervised data storage unit 15 and paired together as a solution/feature air. The solution/feature pair extraction unit 17 takes a feature set as context used in machine learning and takes the solution as a classification.

Step S12: Next, the machine learning unit 18 machine refers to the solution/feature pair extraction unit 17 in order to learn the type of solution that is most suitable for any set of features and stores these learning results in the learning results database 19.

Machine learning methods may include processing steps for calculation employing framing obtained automatically taking into consideration the dependency of each element on the degree of importance of a large number of features. For example, a decision list method, a maximum entropy method, and a support vector machine method etc. shown below may be used, but the present invention is by no means limited in this respect.

The decision list method defines groups consisting of features (each element making up the context using information employed in analysis) and classifications for storage in a list using a predetermined order of priority. When an input data is provided for analysis, the input data and the defined features are compared in order from the highest priority using the list. Where defined features match the input data, the defined classifications corresponding to those features are used as input classification.

In the maximum entropy method, when preset sets of features fj ($1 \leq j \leq k$) are taken to be F, probability distribution p(a, b) is obtained when an expression signifying an entropy is a maximum level while prescribed constraints are fulfilled and classifications having larger probability values are then obtained in accordance with this probability distribution.

In the support vector machine method, data is classified from two classifications by dividing space up into hyperplanes. A detailed description regarding a processing example using the support vector machine method where with high processing accuracy provided below.

The decision list method and the maximum entropy method are described in cited reference 15 in the following. [Cited reference 15: 村田真樹, 内山将夫, 内元清貴, 馬青, 井佐原均, 種々の機械学習法を用いた多義解消実験,電子情報通信学会言語理解とコミュニケーション研究会(Masaki Murata, Masao Uchiyama, Kiyotaka Uchimoto, Ba Sei and Hitoshi Isahara, *Experiments on Word Sense Disambiguation Using Several Machine-Learning Methods,* Society for Language Analysis in Electronic Information Communication Studies and Communications), NCL2001-2, p.p.8-10 (2001)]

Step S13: Data 3 to be solved is inputted to the feature extraction unit 21.

Step S14: The feature extraction unit 21 extracts a set of features from the inputted data and sends the set of features to the feature extrapolation processor 22.

Step S15: The feature extrapolation processor 22, extrapolates the most suitable solutions for the set of features extracted by the feature extraction unit 21 using the learning results stored in learning result database 19 and outputs the solution through analysis information 4.

For example, in case the input of data 3 is "ringo ha taberu (りんごは食べる))(As for an apple, I eat it.)" and the problem to be analyzed is "case to be recognized", then "wo(ヲ) case (an objective case)" is extrapolated as the most suitable solution and outputted as analysis information 4. Further, in case the input of data 3 is "sonnani umaku iku to ha (そんなにうまくいくとは))(It will work out so well.)" and the problem to be analyzed is "verb to be supplemented", then the missed verb "omoenai(思えない))(I don't think)" is outputted as well.

D. Second Embodiment

Figure 4:
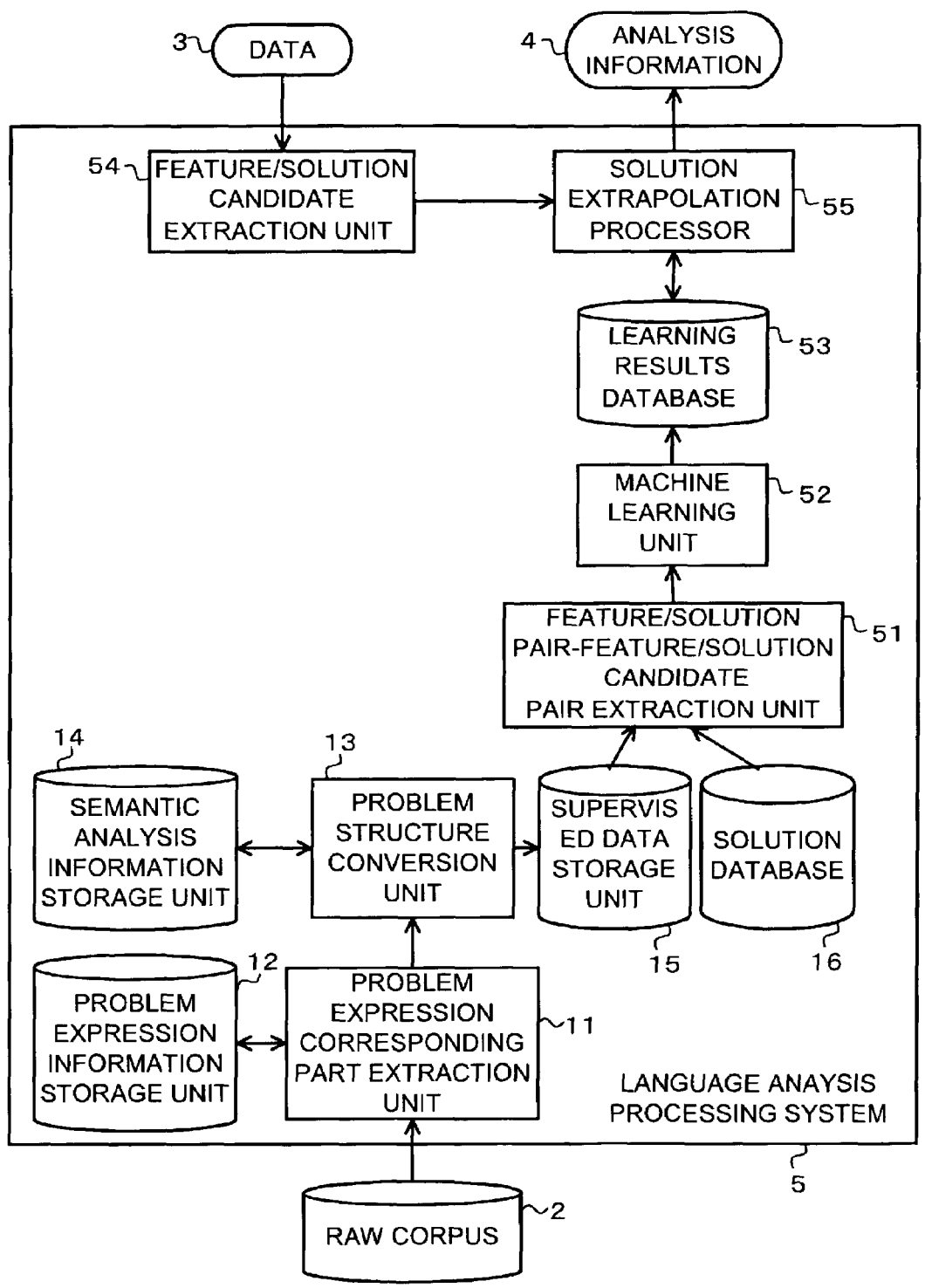
FIG. 4 is a block diagram showing an example system configuration for a case of using a support vector machine method as a machine learning method.

FIG. 4 shows an example of a system configuration according to an embodiment of the present invention using a support vector machine method as a supervised machine learning method. The example configuration for the language analysis processing system 5 shown in FIG. 4 is substantially similar to the example configuration shown in FIG. 1. In FIG. 4, means having the same functions as means shown in FIG. 1 are given the same numbers.

The feature/solution pair-feature/solution candidate pair extraction unit 51 extracts solutions for examples of groups of sets of solution candidates and example features for each example from the supervised data storage unit 15. Here, solution candidates are candidates for solutions other than the solution itself.

The machine learning unit 52 uses a method such as the support vector machine method to determine the probability constituted by a positive or a negative example from groups of sets of solutions or solution candidates and features extracted by the feature/solution pair-feature/solution candidate pair extraction unit 51, and then stores the learning results in a learning results database 53.

The feature/solution candidate extraction unit 54 extracts sets of candidate solutions and features from inputted data 3 and passes these features to the solution extrapolation processor 55.

A solution extrapolation processor 55 refers to the learning results database 53, obtains a probability that is a positive example or a negative example for a set of solution candidates and solutions passed over from the solution/solution candidate extraction unit 54, and outputs the solution candidates for which the probability for positive examples is the largest as analysis information 4.

Figure 5A:
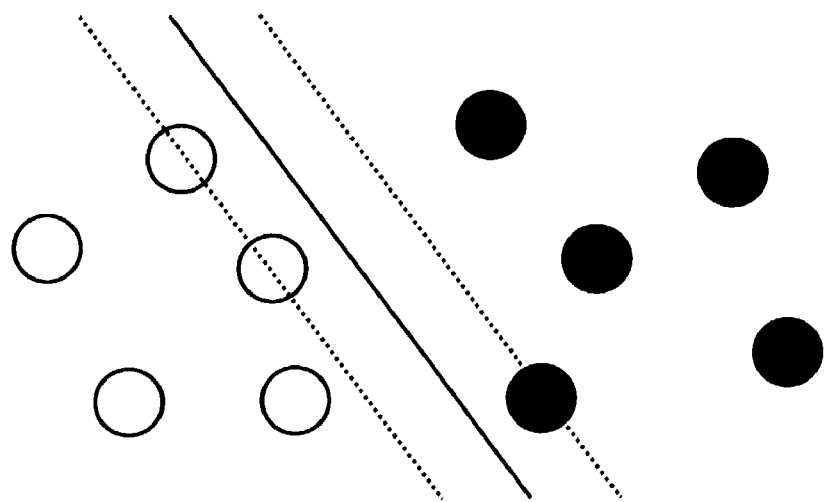
FIG. 5A is a view showing an outline of margin maximization in support vector machine techniques.
Figure 5B:
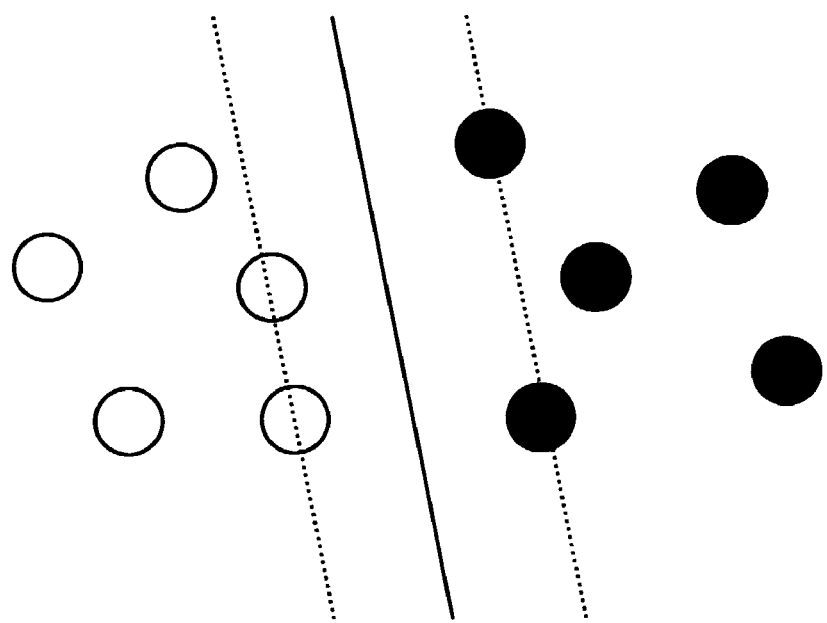
FIG. 5B is a view showing an outline of margin maximization in support vector machine techniques.

An outline of margin maximization for a support vector machine method is shown in FIG. 5A and FIG. 5B in order to illustrate the support vector machine method. In FIG. 5A and FIG. 5B, the white circles represent positive examples, the black circles represent negative examples, the solid lines signify hyperplanes dividing up the space, and the broken lines signify a plane expressing a margin region boundary. FIG. 5A is an outline view of the case (small margin) where the interval between the positive example and the negative example is narrow, and FIG. 5B is an outline view of the case (large margin) where the interval between the positive example and the negative example is broad.

When two classifications are taken to be positive examples and negative examples, the items of learning data for which the intervals between the positive examples and negative examples (margins) are larger are less likely to be mistakenly classified using open data. Classification is then carried out by obtaining a hyperplane where the margin become maximum and then using this hyperplane, as shown in FIG. 5B.

The support vector machine method is basically as described above. However, with learning data, items can be expanded using a method, in which a small number of examples can be included in the inner regin of the margin; alternatively, items can be expanded (through the introduction of a kernel function) so as to make a linear portion of a hyperplane non-linear.

Such an expanded method is equivalent to the following classification using identification functions where discrimination can be achieved into two classifications depending on whether an output value of the identification function shown in FIG. 6 is positive or negative.

When x is the content (set of features) of the example to be identified, xi and yi (i=1, . . . , l, yj∈{1, −1}) are the respectively the context and classification of the learning data, and the function sgn is:

$$\text{sgn}(x)=1 \ (x \geqq 0) \qquad (2)$$
$$-1(\text{otherwise}).$$

Each αi makes equation (3) a maximum based on the constraints of equation (4) and equation (5) in the functions shown in FIG. 7.

Further, the function K is referred to as a Kernel function in which various items may be used. According to an embodiment of the present invention, the following polynomial is used:

$$K(x, y)=(x \cdot y+1)d \qquad (6)$$

where C in equation (4) and d in equation (6) are constants set by experimentation. In the following detailed example, C is fixed at 1 for all processes. Further, two types of 1 and 2 are tried for d. Here, xi where αi>0 is referred to as a support vector, and usually, the portion giving the sum of equation (1) is calculated using only this example. However, in actual analysis, only examples of the learning data referred to as support vectors are used.

Details of the expanded support vector machine method are referenced in cited reference 16 and cited reference 17 in the following.

[Cited reference 16: Nello Cristianini and John Shawe-Taylor, *An Introduction to Support Vector Machines and Other Kernel-based Learning Methods,* Cambridge University Press, (2000)].

[Cited reference 17: Taku Kudoh, *Tinysvm:Support Vector machines,* http://cl.aist-nara.ac.jp/taku-ku//software/TinySVM/index.html,(2000)]

Support vector machine methods handle data with two classifications, so they are usually used in combination with pairwise methods in order to handle data with three or more classifications.

In the case of data having N classifications, the pairwise method is a type of method which creates so-called pairs (N(N−1)/2) of two differing classifications, obtains two value classifiers indicating which is better for each pair (items obtained using a support vector machine method), and finally obtains classifications using a large number of decisions for classifications of the N(N−1)/2 two value classifiers.

A support vector machine taken as the two value classifier according to this embodiment is implemented through a combination of a support vector machine method and a pairwise method and utilizes Tiny SVM made by Kudo in the following cited reference 18.

[Cited reference 18: 工藤拓 松本裕治., Support vector machine を用いたchunk 同定, 自然言語処理研究会 ,(Taku Kudo and Yuji Matsumoto, *Chunking with Support Vector Machines,* Society for Natural Language Processing), 2000-NL-140, p.p.9-11 (2000)]

Figure 8:
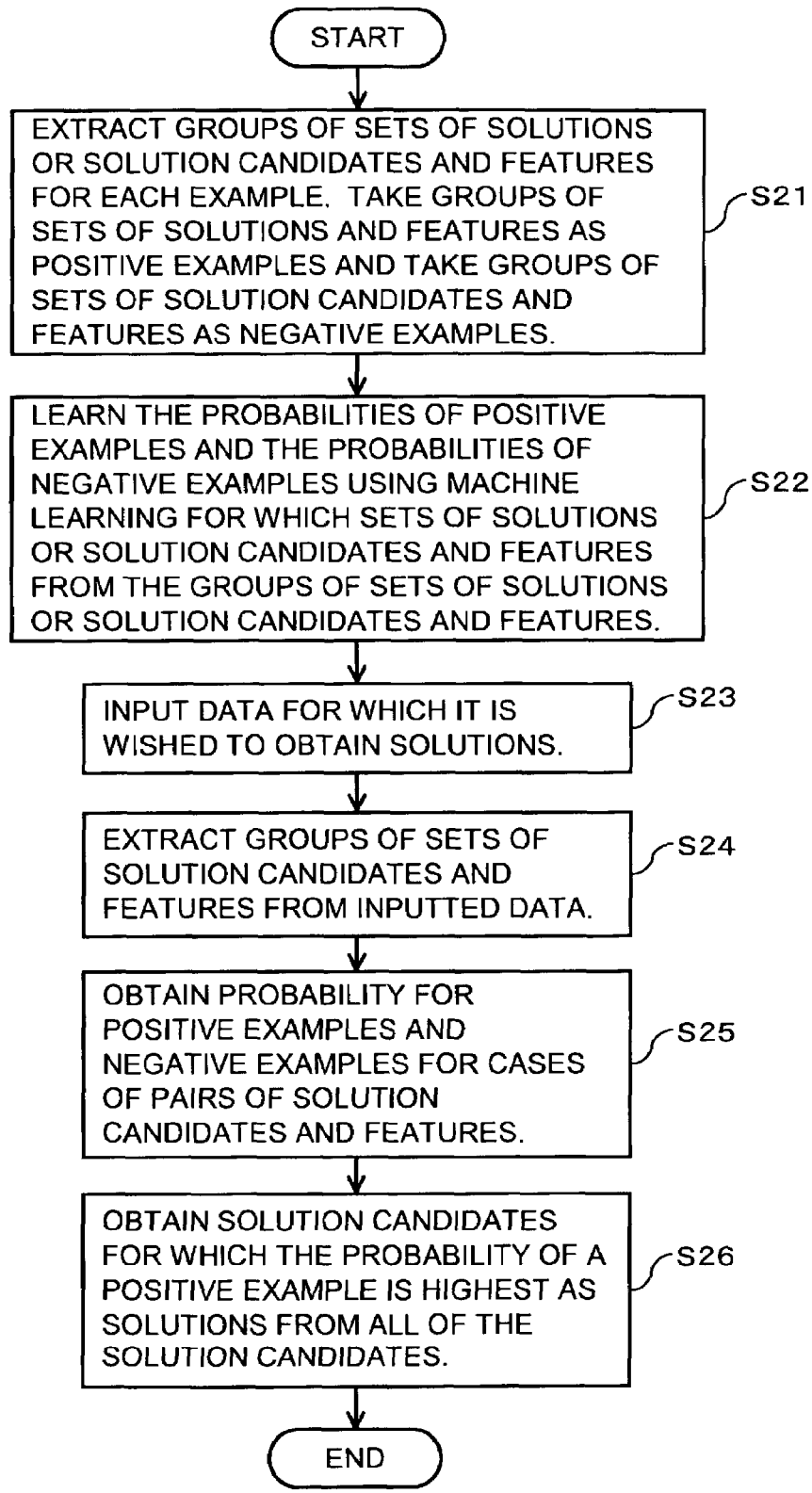
FIG. 8 is a flowchart of an analysis process where a support vector machine method is used as a machine learning method.

FIG. 8 shows a flowchart of an analysis process where a support vector machine method is used as a supervised machine learning method.

Step S21: The feature/solution pair-feature/solution candidate pair extraction unit 51 extracts groups of sets of solutions or solution candidates and features for each example. Groups of sets of solutions and features are taken as positive examples, and groups of sets of solution candidates and features are taken as negative examples.

Step S22: At the machine learning unit 52, learning takes place using a machine learning method such as, for example, a support vector machine method as to when the sets of solutions or candidate solutions and features bring about probabilities constituting positive examples or probabilities constituting negative examples for groups of sets of solutions or solution candidates and features. The results of this learning are then stored in the learning results database 53.

Step S23: Data 3, for which a solution should be obtained, is inputted to the feature/solution candidate extraction unit 54.

Step S24: The feature/candidate feature extraction unit 54 extracts groups of sets of candidate solutions and features from inputted data 3 and sends these features to the solution extrapolation processor 55.

Step S25: The solution extrapolation processor 55obtains probability constituted by a positive example and probability constituted by a negative example for the solution candidates and features received from the feature/candidate feature extraction unit 54. This probability is calculated for all solution candidates.

Step S26: Candidate solutions for which the probability of a positive example is highest are obtained at the solution extrapolation processor 55 from all of the solution candidates and analysis information 4 to be solved by the solution candidates is outputted.

Supervised data stored in the supervised data storage unit 15 is usually in the format of a supervised data "problem→solution". This can therefore be used simultaneously together with supervised data (non-borrowing-type supervised data) taken from original data from a corpus with tags for use with the analysis target. If the supervised data and the non-borrowing-type supervised data are used together, a large amount of information can be utilized and the accuracy of the results of machine learning can therefore be improved.

However, in correspondence analysis etc., it is difficult to specify referents using information only for examples for which the referent is in the original sentence and there are cases where carrying out analysis using only the adopted supervised data is not possible. Such cases can be dealt with using the combined-type supervised learning method.

Regarding the example "ringo wo taberu(りんごを食べる)(I eat an apple.)", the following is obtained as the generated supervised data, "problem→solution":

"ringo(りんご)(an apple) <case to be identified>taberu (食べる)(eat)"→"wo(wo(を))(an objective case)."

However, where, the original supervised data.

"problem→solution":"ringo mo taberu (りんごも食べる)")(eat an apple, too)"→"wo(を)(an objective case)", is used fore supervised data processing, then the portion of case particle "mo(も)" and <case to be identified> are slightly different. In one respect, case particle "mo(も)" is to be <case to be identified>, but the amount of information is excessive as there is only "mo(も)" in the original supervised data. In other words, by using the non borrowing supervised data, more information may be obtained. The processing using the combined-type supervised learning method can therefore be considered marginally preferable.

In case analysis also, surface case is not always supplemented, and sentences employing surface case cannot be transformed. Therefore, there is a problem that external relationships (relationship that cannot be made case relationships) etc. cannot be handled with supervised data.

If the linking up, that is, case analysis is undone and sentence interpretation is looked at from the point of view of re-phrasing, then external relationships can also be handled by machine learning using supervised data. For example, if a given phrase "sanma wo yaku kemuri (さんまを焼くけむり)(smoke from grilling a saury)" is considered as having an external relationship, it can be paraphrased to the sentence "sanma wo yaku toki ni deru kemuri (さんまを焼く時に出るけむり)(smoke which is caused while a saury is grilled)". If there is a problem which is set to be interpreted by paraphrasing it with the sentence "sanma wo yaku toki ni deru kemuri (さんまを焼く時に出るけむり)")(smoke which is caused when a saury is grilled)", this can be applied to a supplementation of ellipsis problem in which the expression "toki ni deru ((時に出る))( . . . is caused while . . . )" is to be provided as a solution, which in turn is supplemented between an adnominal clause and its antecedent. This means that such a problem can be handled in a machine learning method using borrowing-type supervised data, and be suitable to be processed in the combined-type supervised learning method.

Further, it can also be considered that handling is possible not just for ellipsis analysis but also for generation. The borrowing-type supervised learning method, i.e. regarding the point whereby a corpus that is not provided with tags giving an analysis target is used, the similarity of abbreviated analysis and generation is pointed out in the following cited reference 19.

[Cited reference 19: 村田真樹, 長尾真, 表層表現と用例を用いた照応省略解析手法,言語理解とコミュニケーション研究会, (Masaki Murata and Makoto Nagao, *Anaphora/Ellipsis*

*Resolution Method Using Surface Expressions and Examples,* Society for Language Analysis and Communication Research), NCL97-56, p.p.10-16 (1997)]

As an example of generation of case particles, a problem-solution group is

"problem→solution":

"ringo(りんご)(an apple)←<obj>taberu(食べる)(eat)"→"wo(を)(a case particle denoting an objective part)".

In the case of generation, the semantics of a generated portion are typically expressed using a deep case etc. (example: <obj>). Here, <obj> means a case particle denoting an object. This problem/solution group indicates that the portion for this <obj> becomes "wo(を)(a case particle denoting an objective part)" in the results for generating a case particle and corresponds to the aforementioned non-borrowing-type supervised data.

Furthermore, in this problem, the borrowing-type supervised data are extracted as the sentence "ring wo taberu (りんごを食べる)(eat an apple)" from the raw corpus 2 which is not provided with tags giving the analysis target and are handled as a borrowing learning signal so as to give the following.

"problem→solution":

"ringo(りんご)(an apple)<case to be generated>taberu 食べる)(eat)"→"wo(を)(a case particle denoting an objective part)".

The non-borrowing-type supervised data and the-borrowing-type supervised data are therefore extremely similar and differ only slightly with regards to the portions for <obj> and <case to be generated>. Therefore the borrowing supervised data can therefore also be used sufficiently as supervised data in a similar manner to the non-borrowing-type supervised data. Hence the borrowing-type supervised learning method can therefore also be used with the generation of case particles.

Further, with the portions <obj> and <case to be generated>, <obj> has a greater amount of information due to only having <obj>. This means that, with regards to this problem, the original supervised data, i.e. the non-borrowing-type supervised data, has more information. It is therefore preferable to use the combined-type supervised learning method using non-borrowing-type supervised data rather than just borrowing-type supervised data.

Further, an example of case particle generation occurring in English/Japanese machine translation is shown. In this problem, the problem/solution group is provided in the manner:

"problem→solution":

"eat→apple"→"wo(を)(a case particle denoting an objective part)".

This shows that the relationship between "eat" and "apple" in the sentence "I eat apple" is "wo(を)" when converting from English to Japanese and corresponds to non-borrowing-type supervised data.

Further, in this problem, the sentence "ringo wo taberu (りんごを食べる)(eat an apple)" is extracted from the raw corpus 2 not provided with tags giving the analysis target and this is handled as borrowing-type supervised data.

"problem→solution":

"ringo(りんご)(an apple)<case to be generated>taberu (食べる)(eat)"→"wo(を)(a case particle denoting an objective part)".

When looking at this problem, it can be seen that the original supervised data (non-borrowing-type supervised data) and borrowing-type supervised data do not have any matching portions whatsoever. Therefore, if the situation remains as is, then the borrowing-type supervised data is not performing its function. Portions as problems of the respective data (signals) are then translated from English to Japanese or Japanese to English. In doing so, then "problem→solution":

"eat(taberu)→apple(ringo)"→"wo (a case particle)" becomes

"problem→solution":

"ringo(apple)(りんご)<case to be generated>taberu(eat) (食べる)"→"wo(を)."

As there is a slight matching in this situation, the borrowing supervised data also plays the role of a supervised data. For example, words are cut out, and the features used in learning are:

"eat", "apple", "taberu(食べる)(eat)", "ringo(りんご)(an apple)", so that there is substantial matching.

With machine translation, if candidates for translations of each portion are combined and all of the translation is combined and the processing of translations for other portions is performed in advance, then it is assumed that the portions for "eat→apple" are already "taberu(食べる)(eat)→ringo (りんご)(an apple)", and supervised data of "problem→solution": "taberu(食べる)(eat)→ringo (りんご)(an apple)"→"wo(を)(a case particle denoting an objective part)"

is preferred for handling.

In this case, there are matching portions at the problematic portions of the original supervised data and borrowing-type supervised data and utilization in a borrowing-type supervised learning method is possible.

Further, in combining candidates for translation of each portion and all of the translation, when a plurality of candidates for translation of each portion remain, it is preferable for solutions to be obtained while all solution candidates for these combined portions remain. When these translation candidates are handled as solution candidates, translation results can be utilized for portions (in this case "taberu(食べる)(eat)" and "ringo(りんご)(an apple)") other than the solutions (in this case "wo(を)(a case particle denoting an objective part)").

In the case of processing using the borrowing-type supervised learning method, in the example configuration for a system shown in FIG. 1 and FIG. 4, it is necessary for the solution database 16 to be prepared in advance. The solution database 16 is a corpus that can be used in machine learning with conventional supervised learning with analysis information being assigned manually, etc. In the case of the system shown in FIG. 1, the solution/feature pair extraction unit 17 extracts groups of sets of solutions and features for each example from the supervised data storage unit 15 and the solution database 16. In the system shown in FIG. 4, the feature/solution pair-feature/solution candidate pair extraction unit 51 similarly extracts groups of sets of solutions or solution candidates and features for each example from the supervised data storage unit 15 and solution database 16.

E. Specific Example

A specific processing example for these embodiments is described in the following.

Specifically, the problematic settings and features (information used in analysis) for the case analysis in the specific example are descried in the context used in machine learning and classification. The target of the case analysis is to the following.

relationship between declinable word or clause for an embedded sentence and a preceding related substantive and relationship between substantives and declinable words (for example, "kono mondai {sae} tokareta (この問題{さえ}解かれた)" ({Even} this problem is solved.) in the case where the substantive acts on the declinable word with the exception of substantives to which only case particles become attached and substantives for which the particles have no end.

As classifications, six case particle types, namely, "ga(ガ) case" denoting a subjective part, "wo(ヲ) case" denoting an objective part, "ni(ニ) case" denoting an indirect objective part, and "de(デ) case", "to(ト) case" and "kara(カラ) case" which denote parts of position, means, time, etc. are provided. Further, another seven classifications, such as external relationship, a subjective part which does not have any case relationship, etc., are provided, as well. Here, a case which is to be extrapolated in a passive sentence is processed without modification. For example, in the case of "tokareta mondai(解かれた問題)"(a solved problem)", this becomes "mondai ga tokareta(問題が解かれた)"(a problem is solved)" and is handled as a "ga(ガ) case (a case particle denoting a subjective part)". It is not used with the approach whereby the passive is put into active form to give the interpretation of "mondai wo toku(問題を解く)"(solve a problem)" and give a "wo(ヲ) case(a case particle denoting an objective part)".

The external relationship can therefore be said to be a case where the declinable word for the relative clause and the preceding related substantive cannot be put in the form of a case relationship. For example, in the sentence "sanma wo yaku nioi (さんまを焼くにおい)"(smell of grilling a saury)", a case relationship cannot be established between "yaku(焼く)"(grill)" and "nioi(おい) (smell)" and this kind of sentence is referred to as an external relationship.

There are also items that are classified as "others" that are not subjects, such as, the "kyuujyu ichi nen mo(九一年も)"(in 1991, again)" in "{kyuujyu ichi nen mo} shussei ga zen-nen yori sen ropphyaku roku juu nin ooukatta ({九一年も}出生数が前年より千六百六十人多かった)"({In 1991, again,} the number of live births was 1,660 more than the previous year.)." This example may allow a "ga(ガ) case" as a solution because the sentence having "kyuujyu ichi nen mo (九一年も)" is considered as a "ga-ga sentence(ガガ文)" which includes two ga(ガ) cases in one sentence.

Further, in "kako ichi nen kan ni {san do mo} syusyou ga kawaru(去一年間に{三度も} 首相が代わる)"(In the last one year, the prime ministers changed even three times)", adverbs such as "san do mo(三度も )"(even three times)" are also classified as "others."

In this example, if a case particle "mo(も)" is not present, it is not considered a target of analysis. If the data are fields where there is little occurrence of a particle drop, it may be possible to determine that an adverb is present even if there is not even a single particle. However, if particle case ellipsis is determined, there is a possibility that there is a case relationship between a substantive with no particle and a preceding related declinable word. It is therefore necessary to make all of these substantives targets of analysis.

Further, the following features are defined as context. These are expressed for example, as obtaining a case relationship between a substantive n and a declinable word v.

Type 1. Is the problem an embedded clause or a topicalization problem?

If it is a topicalization problem, a case particle is associated with the substantive n.

Type 2. Part of speech of declinable word v.

Type 3. Root form of word of declinable word v.

Type 4. Numbers for the classification type numbers of 1, 2, 3, 4, 5 and 7 digits for the lexicological classification of the word of the declinable word v. Here, changes are carried out to the classification numbers in the document table.

Type 5. Auxiliary verb (for example, "reru(れる)(can)", "saseru(させる)(must)") associated with the declinable word v.

Type 6. Word for the substantive n

Type 7. Numbers for the classification numbers of 1, 2, 3, 4, 5 and 7 digits for the lexicological classification of the word of the substantive n. Here, changes are carried out to the classification numbers in the document table.

Type 8. Word strings for substantives other than substantive n for the declinable word v. Here, information as to what kind of case is applied is marked using AND.

Type 9. Numbers for the classification numbers of 1, 2, 3, 4, 5 and 7 digits for the lexicological classification of the word set for substantives other than the substantive n applied to the declinable word v. Here, changes are carried out to the classification numbers in the document table. Further, information as to what kind of case is applied is marked using AND.

Type 10. Cases taken for substantives other than substantive n for the declinable word v.

Type 11. Words collocated in the same sentence.

In this example, several of the above features are used. The feature mentioned in type 1 cannot be used in cases where machine learning adopting supervised data is used.

First, the processing is carried out using machine learning having a conventional supervised learning (a non-borrowing-type supervised learning method). The data used is one day of the *Mainichi Daily News* (毎日新聞) issued on Jan. 1, 1995 in the Kyoto University corpus (refer to cited reference 20).

[Cited reference 20: 黒橋禎夫, 長尾真,京都大学テキストコーパス・プロジェクト,言語処理学会第3回年次大会,(Sadao Kurohashi and Makoto Nagao, *Kyoto University Text Corpus Project*, Third Annual Conference of the Language Processing Society), pp118 (1997)]

Classifications are assigned to the data using problem settings defined as described above. Portions for which it is determined that construction tags of the Kyoto University corpus are incorrect are then removed from the data. The number of such portions in this example is 1,530. FIG. 9 is a view showing distribution of appearances of classifications in all examples. It can therefore be understood from the distribution of this example that ga(ガ) cases are by far the most common within the examples for the corpus, and that external relationships occurring for embedding are also plentiful.

Next, the processing is carried out using a machine learning borrowing-type supervised data. The example for use with borrowed supervised data is used for the portion for the sixteen days from Jan. 1 to 17 1995 of the *Mainichi Daily News* in the Kyoto University Corpus. For this data, only items for which a modified relationship for the substantives and declinable words is linked using case particles are taken as supervised data. The number of such items in this example is 57,853. At this time, the feature of 1. of the aforementioned defined features cannot be used to bring data from items that are not subject to topicalization or transformed into embedded sentences.

A TiMBL method, a simple Bayesian (SB) approach, a decision list method (DL), a maximum entropy method (ME) or a support vector machine method (SVM) may be used as a machine learning method. The TiMBL method and the simple Bayesian method are used in order to compare the processing accuracy.

The TiMBL method is a system developed from Daelemans, and employs k neighborhood methods collecting together k similar examples (refer to cited reference 5). Moreover, in the TiMBL method it is not necessary to define the degree of similarity between examples in advance and is calculated automatically in the form of degree of similarity between weighted vectors taking features as elements. In this document, k=3 is used with other aspects being utilized in default settings. The simple Bayesian approach is one method of the k neighborhood methods for which degrees of similarity are defined in advance.

First, the problem with re-extrapolating the surface case is resolved in order to investigate the basic performance of the borrowing-type supervised learning method. This is to test whether the surface case in the sentence can be erased and then re-extrapolated. The test is then carried out using cross-validation dividing up each article by 10 using the borrowed supervised data (57,853 items).

The results (accuracy) of the processing for each method are shown in FIG. 10. Here, TiMBL, SB, DL, ME and SVM refer to the TiMBL method, the simple Bayesian approach, the decision list method, the maximum entropy method and the support vector machine method, respectively. As shown in FIG. 10, the support vector machine method (SVM) is more precise, with an accuracy of 70%. From the results of this processing it is shown that processing can be carried out at no less than this accuracy level for generation of particles occurring in generated sentences. In the case of processing of generated sentences, by using processing employing the borrowing-type supervised learning method, it is also possible to provide input in the form of information for some kind of case such as a deep case, etc. This means that more precise results than the processing results shown in FIG. 10 can be obtained. Further, it can be understood that the problem with supplementing a typical case drop can be alleviated if this degree of processing accuracy can be obtained.

Moreover, the surface case restoration processing is carried out using a machine learning method borrowing supervised data on data subjected to topicalization/transformed into an embedded sentence that is prepared in advance. In this case, with borrowing-type supervised data, it is not possible to extrapolate a classification for "others" for external relationships etc. and the processing is therefore carried out with examples for the classification of "others" eliminated. This therefore reduces the number of examples of data for use in evaluation from 1,530 to 1,188. In machine learning, the borrowing-type supervised data (57,853 items) just collected together are used. FIG. 11 shows the results of this processing.

In this processing, evaluation may also take place taking the average accuracy for the four cases of "ga(ガ)", "wo(ヲ)", "ni(ニ)" and "de(デ)". FIG. 12 shows the results of this processing. The results using the non-borrowing-type supervised learning method using the learning of 1,188 examples are also shown for comparison. Results are also shown for using the combined-type supervised learning method combining both the 1,188 non-borrowing-type supervised data and 57,853 borrowing-type supervised data. In these processes, cross validation dividing into 10 in units of articles is performed, and the same supervised learning data (signals) and unsupervised learning signals as for the examples of analysis targets are not used.

The following can then be understood from the results. First, investigations are made using the accuracy for all of the examples of processing results shown in FIG. 11. The support vector machine method is typically considered the best for mechanical learning methods. Only the results for the support vector machine method are used in the following experimentation.

The accuracy of the borrowed-type supervised learning method is 55.39%. The cases that mainly appear are the four cases of "ga(ガ) case", "wo(ヲ) case", "ni(ニ) case" and "de (デ) case". The processing accuracy in the case of random selection is 25%, and results that are better than this can be obtained. The accuracy obtained when using the borrowing-type supervised data can be considered to be good.

Amongst the combined, borrowing-type, and non-borrowing-type methods, the non-borrowing-type supervised learning method is the most appropriate. There is a possibility that borrowing-type supervised data may possess different properties from those of the actual problem. There is therefore a sufficient possibility that processing accuracy will be lowered due to borrowing of this kind of data. The processing results shown in FIG. 11 can be considered to be a reflection of these kinds of conditions.

The data used in the processing evaluation is 1,188 examples, of which, 1,025 examples are "ga(ガ) cases", giving a probability of the appearance of "ga(ガ) case" of 86.28%. This means that if, everything is discerned to be a ga (ガ) case, an accuracy of 86.28% will be obtained. However, with this kind of determination, the accuracy of analysis of other cases is 0% and there is the possibility that these processing results will not play any role whatsoever depending on the application. Evaluation is carried out using the average accuracy of the four cases of "ga(ガ) case", "wo(ヲ) case", "ni(ニ) case" and "de(デ) case" shown in the results of processing shown in FIG. 12. According to this evalution, the accuracy of a method where decisions are made depends on classifications for which the highest frequency is 25%. It can therefore be understood that an accuracy of greater than 25% is achieved with the combined, borrowing and non-borrowing types.

In averaged evaluation, the order of accuracy is the combined type, followed by the borrowing-type, and then the non-borrowing-type. It can be said that the non-borrowing-type supervised learning method can more easily yield a high degree of accuracy due to using closely supervised data with problems, and it can also be understood that accuracy is lower than for other machine learning methods when the number of examples is small, such as with this example.

As also shown in FIG. 11, the combined-type supervised learning method is only 1% inferior to the borrowing-type supervised learning method and good results can be obtained for both evaluation standards. The evaluation using the average shown in FIG. 12 is also extremely good and both evaluation standards bring about good results.

As a result of the above, the borrowing-type supervised learning is more effective than random selection and it can be understood that taking the average of classifications as an evaluation standard is more effective than the non-borrowing-type supervised learning method. It can also be understood that stability can be achieved using the combined-type supervised learning method with a plurality of evaluation standards. The effectiveness of the borrowing-type supervised learning method and the combined-type supervised learning method is also shown.

Next, the general processing for a case analysis including classifications for external relationships such as "others" is carried out. All of the evaluation data (1,530 items) is used in this processing. In this processing, two methods of the combined-type and non-borrowing-type are carried out. The classification of "others" can only not be specified with borrowing supervised data and the borrowing-type supervised learning method is therefore not used. FIG. 13 shows the results of this processing.

In this processing, evaluation may also take place by taking the average accuracy for the five cases of "ga(ガ)", "wo(ヲ)", "ni(ニ)", "de(デ)" and others. FIG. 14 shows the results of this processing. From the processing results, the accuracy of the processing using the support vector machine method is the most superior, and the combined-type supervised learning method has an accuracy in processing for all of the examples which is approximately only 1% lower than that for non-borrowing-type. The average accuracy is therefore dramatically higher for the combined-type supervised learning method.

As shown in the specific example above, it can be understood that analysis processing using the borrowing-type supervised learning method have a higher accuracy than that for random selection. Further, the accuracy averaged for the accuracy for each classification is also greater than the accuracy of analysis processing using the non-borrowing-type supervised learning method. Further, it can be confirmed that the combined-type supervised learning method is not just accurate over all of the examples, but is also highly accurate when the accuracy is averaged across the classifications, so that stability can be attained across a plurality of standards so as to obtain a high accuracy. The effectiveness of the analysis processing of the present invention can therefore be confirmed.

In the above, a description is given of practical implementations of the present invention but various modifications are possible within the scope of the present invention.

In the above description, according to the present invention, a large amount of supervised data can be borrowed with the exception of conventional supervised data, the supervised data used can be increased, and it is therefore anticipated that the learning accuracy will be increased.

Various high-grade methods are therefore proposed for machine learning methods. In the present invention, the language processing such as case analysis etc. is converted in order to handle machine learning methods. The most appropriate machine learning method for a particular time is then selected so that problems in language analysis processing can be solved.

Further, in addition to using an improved method, the use of improved and more plentiful data and features is necessary to improve the accuracy of the processing. In the present invention, as a result of using the borrowing-type supervised learning method and the combined-type supervised learning method, a broader range of information can be utilized and a broader range of problems relating to analysis can be handled. In particular, examples that are not supplemented manually with analysis information can be used using the borrowing-type supervised learning method. It is therefore possible to improve the processing accuracy as a result of utilizing a large amount of information without increasing the workload.

Further, in the present invention, by using combined machine learning techniques, in addition to the use of a large amount of information, the language processing can be carried out using better information than when using only conventional supervised data. This means that still greater improvements in the processing accuracy can be achieved.

Each of the means, functions, and elements of the present invention may also be implemented by a program installed in and executed on a computer. The program implementing the present invention may be stored on an appropriate recording medium readable by a computer such as portable memory media, semiconductor memory, or a hard disc, etc., and may be provided through recording on such a recording media, or through exchange utilizing various communications networks via a communications interface.

What is claimed is:

1. A system for analyzing Japanese language using supervised learning method, the system comprising:

sentence data storage means for storing sentence data which do not include solutions for a target problem;

problem expression storage means for storing problem expression data comprising a problem expression which indicates an object of a language analysis and information of expressions corresponding to said problem expression;

problem expression extraction processing means for extracting a portion which corresponds to any one of the expressions corresponding to the problem expression from said sentence data by using a predetermined language analysis and replacing the extracted portion of the sentence data with the problem expression;

supervised data creation processing means for creating a plurality of supervised data, which is formed as a pair of a problem and either a solution or a solution candidate, wherein the pair comprises the sentence data in which the portion is replaced with the problem expression as the problem and either the portion extracted from said sentence data by the problem expression extracting processing means as the solution or the portion extracted from other sentence data except said sentence data, which are stored in said sentence data storage means as the solution candidate;

supervised data features obtaining processing means for obtaining a plurality of predetermined syntactic supervised data features, which include one or more of a part of speech, root form, lexical category, dependency structure and modification structure from each sentence of the supervised data using syntactic analysis and then generating solution/features pairs of each sentence of the supervised data, wherein the solution/features pairs are a positive example having the plurality of supervised data features and the solution and negative examples having the plurality of supervised data features and each one of the solution candidates;

machine learning processing means for performing machine learning, processing on the solution/features pairs using a kernel function executed as a support vector machine, by classifying the solution based upon generating a hyperplane which maximizes an interval of the positive and negative examples and divides these two examples by the hyperplane on a space having dimensions determined by the plurality of obtained featuresand storing the hyperplane as the result of the machine learning processing in the learning result storing database;

object sentence data obtaining processing means for inputting object sentence data and obtaining a plurality of syntactic object sentence features, which include one or more of a part of speech, root form, lexical category, dependency structure and modification structure from the input object sentence data using the syntactic analysis; and solution extrapolation processing means for using the stored hyperplane to determine which divided part of the space does the plurality of the syntactic object sentence features belong to, and estimates a determined part with highest probability as the solution as classified for the plurality of syntactic object sentence features.

2. The system according to claim 1, wherein the machine learning processing means processes machine learning on the solution/features pairs according to importance of each feature in relation to the dependency relation among features obtained using the analysis.

3. The system according to claim 1, further comprising:
solution data storage means for storing supervised data as a pair of a sentence data and a solution corresponding to a target problem,
wherein the machine learning processing means performs machine learning using borrowing-type supervised data which is created by said supervised data creation processing means, and non-borrowing-type supervised data which is stored in said solution data storage means.

4. The system according to claim 1, wherein
the machine learning processing means generates rules which is constituted from the solution/features pair, arranges the rules in a rule list according to a predetermined order, and stores the rule list as the result of the machine learning processing in the learning result storing database; and
the solution extrapolating processing means searches, in said rule list, for a rule from the stored rule list, matches the solution/features pair with the plurality of object sentence features from input object sentence data, and estimates the solution of the rule as the solution classified according to the plurality of object sentence features from input object sentence data.

5. The system according to claim 1, wherein
the machine learning processing means specifies a classification which can serve as a solution of supervised data, calculates a probability distribution made of two terms of the classifications, each term being a solution/features pair, when said plurality of features fulfills a predetermined condition and maximizes a value of a predetermined formula representing an entropy, and stores said probability distribution as the result of the maching learning processing in the learning result storing database; and
the solution extraction processing means specifies the classification according to which the solution has the largest value of the formula based on the result and extrapolates the specified classification as the most suitable solution for the plurality of object sentence features.

6. A Japanese language ellipsis analysis processing method for carrying out ellipsoidal analysis including transformation by paraphrasing using machine learning method, the method comprising:
storing sentence data, which do not include solutions for a target problem, in a sentence data storage;
storing problem expression data, each data comprising a problem expression that is the object of language analysis and information of expressions corresponding to that problem expression, in a problem expression storage;
extracting a portion of each sentence data that matches any of the expressions corresponding to the problem expression using a predetermined language analysis method and replacing the extracted portion of the sentence data with the problem expression;
creating supervised data as a pair of a problem and either a solution or a solution candidate for each sentence data, the problem being the sentence data in which the extracted portion has been replaced with the problem expression, the solution being the extracted portion of the sentence data, and the solution candidate being extracted from other sentence data;

obtaining a plurality of predetermined syntactic supervised data features, which include one or more of a part of speech, root formm, lexical category, dependency structure and modification structure, from each sentence of the supervised data using syntactic analysis and then generating solution/features pairs, for each sentence of the supervised data, wherein the solution/features pairs are a positive example having the plurality of supervised data features and the solution and negative examples having the plurality of supervised data features and each one of the solution candidates;
performing machine learning on the solution/features pairs using a kernel function executed as a support vector machine, by classifying the solution based upon generating a hyperplane which maximizes an interval of the positive and negative examples and divides these two examples by the hyperplane on a space having dimensions determined by the plurality of obtained features and storing the hyperplane as a result of the machine learning in a learning result database;
inputting object sentence data and obtaining a plurality of syntactic object sentence features, which include one or more of a part of speech, root form, lexical category, dependency structure and modification structure from the input object sentence data using syntactic analysis; and
using the stored hyperplane to determine which divided part of the space does the plurality of the syntactic object sentence features belong to, and estimates a determined part with highest probability as the solution as classified for the plurality of syntactic object sentence features.

7. An apparatus analyzing Japanese language using supervised learning method, the system comprising:
sentence data storage storing sentence data which do not include solutions for a target problem;
problem expression storage storing problem expression data comprising a problem expression which indicates an object of a language analysis and information of expressions corresponding to said problem expression; and
a controller,
extracting a portion which corresponds to any one of the expressions corresponding to the problem expression from the sentence data by using a predetermined language analysis and replacing the extracted portion of the sentence data with the problem expression,
creating a plurality of supervised data which is formed as a pair of a problem and either a solution or a solution candidate, wherein the pair comprises the sentence data in which the portion is replaced with the problem expression as the problem and the portion extracted from said sentence data by the problem expression extracting processing means as the solution or the portion extracted from other sentence data as the solution candidate,
obtaining a plurality of predetermined syntactic supervised data features, which include one or more of a part of speech, root form, lexical category, dependency structure and modification structure from each supervised data using syntactic analysis and then generating solution/features pairs for each sentence of the supervised data, wherein the solution/features pairs are a positive example having the plurality of supervised data features and the solution and negative examples having the plurality of supervised data features and each one of the solution candidates, performing machine learning processing on the solution/features pairs using a kernel function executed as a support vector machine, classifying the solution based upon generating a hyperplane which maximizes an interval of the positive and negative examples and divides these two examples by the hyperplane on a space having dimensions determined by the plurality of obtained features and storing the hyperplane in a learning result database, inputting object sentence data and obtaining a plurality of syntactic object sentence features, which include one or more of a part of speech, root form, lexical category, dependency structure and modification structure from the input object sentence data using the syntactic analysis, and using the stored hyperplane in determining which divided part of the space does the plurality of the syntactic object sentence features belong to, and estimating a determined part with highest probability as the solution as classified for the plurality of syntactic object sentence features.

* * * * *

UNITED STATES PATENT AND TRADEMARK OFFICE
CERTIFICATE OF CORRECTION

PATENT NO.         : 7,542,894 B2
APPLICATION NO. : 10/189580
DATED              : June 2, 2009
INVENTOR(S)        : Masaki Murata It is certified that error appears in the above-identified patent and that said Letters Patent is hereby corrected as shown below:

On the Title Pg Item (57) (Abstract), Line 2, change "the" to --with--.

On the Title Pg Item (57) (Abstract), Lines 12-13, change "inputting" to --inputted--.

Column 24, Line 38, change "pairs of" to --pairs for--.

Column 24, Lines 51-52, change "featuresand" to --features and--.

Column 24, Line 62, change "extrapolation" to --extrapolating--.

Column 25, Line 37, change "maching" to --machine--.

Column 26, Line 3, change "formm," to --form,--.

Signed and Sealed this

Twenty-seventh Day of October, 2009

David J. Kappos
*Director of the United States Patent and Trademark Office*